United States Patent
Thomas et al.

(10) Patent No.: US 10,989,132 B2
(45) Date of Patent: Apr. 27, 2021

(54) METHOD AND SYSTEM FOR FUEL INJECTOR BALANCING

(71) Applicant: Ford Global Technologies, LLC, Dearborn, MI (US)

(72) Inventors: Joseph Lyle Thomas, Farmington Hills, MI (US); Ethan D. Sanborn, Saline, MI (US); Ross Dykstra Pursifull, Dearborn, MI (US); Mark Meinhart, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/516,168

(22) Filed: Jul. 18, 2019

(65) Prior Publication Data

US 2021/0017928 A1 Jan. 21, 2021

(51) Int. Cl.
*G06F 17/00* (2019.01)
*F02D 41/24* (2006.01)
*F02D 41/40* (2006.01)
*F02D 41/00* (2006.01)
*F02D 41/38* (2006.01)

(52) U.S. Cl.
CPC ..... *F02D 41/2451* (2013.01); *F02D 41/0085* (2013.01); *F02D 41/2438* (2013.01); *F02D 41/402* (2013.01); *F02D 2041/389* (2013.01); *F02D 2200/0602* (2013.01); *F02D 2200/0616* (2013.01)

(58) Field of Classification Search
CPC ............. F02D 41/2451; F02D 41/0085; F02D 41/2438; F02D 41/402; F02D 41/22; F02D 41/221; F02D 41/222; F02D 2041/389; F02D 2041/223; F02D 2041/224
USPC ........ 123/456, 457, 479; 701/103–105, 107; 73/114.43, 114.51
See application file for complete search history.

(56) References Cited

U.S. PATENT DOCUMENTS

| | | | |
|---|---|---|---|
| 7,865,293 B2 * | 1/2011 | Ishizuka | F02D 41/40 123/486 |
| 8,543,314 B2 * | 9/2013 | Nakata | F02D 41/2096 123/456 |
| 9,588,016 B2 * | 3/2017 | Ishizuka | F02D 41/3836 |
| 9,593,637 B2 | 3/2017 | Surnilla et al. | |
| 2019/0195154 A1 * | 6/2019 | Ahn | F02D 41/26 |

OTHER PUBLICATIONS

Surnilla, G. et al., "Method and System for Fuel Injector Balancing," U.S. Appl. No. 16/156,705, filed Oct. 10, 2018, 40 pages.
(Continued)

*Primary Examiner* — Gonzalo Laguarda
(74) *Attorney, Agent, or Firm* — Geoffrey Brumbaugh; McCoy Russell LLP

(57) ABSTRACT

Methods and systems are provided for injector correction learned while a direct injector delivers fuel as a group of fuel injections per cylinder event. The correction is learned using a pressure based injector balancing approach while relies on a sensed pressure drop across the group of fuel injections. Errors for individual pulses of the group of injections is learned as a function of inter-injection spacing and individual pulse-width commands.

19 Claims, 6 Drawing Sheets

(56) References Cited

OTHER PUBLICATIONS

Pursifull, R. et al., "Method and System for Determining Fuel Injector Variability," U.S. Appl. No. 16/250,755, filed Jan. 17, 2019, 67 pages.
Pursifull, R. et al., "Method and System for Fuel Injector Balancing," U.S. Appl. No. 16/355,319, filed Mar. 15, 2019, 68 pages.
Pursifull, R. et al., "Method and System for Fuel Injector Balancing," U.S. Appl. No. 16/355,380, filed Mar. 15, 2019, 69 pages.
Pursifull, R. et al., "Method and System for Fuel Injector Balancing," U.S. Appl. No. 16/358,396, filed Mar. 19, 2019, 54 pages.

* cited by examiner

| Base Separation = 1000 us ||
|---|---|
| Prior Injection Pulse Width (us) | Subsequent Injection Pulse Width Reduction (us) |
| 0 | 0 |
| 200 | 100 |
| 300 | 90 |
| 400 | 60 |
| 600 | 55 |
| 1000 | 40 |

702

| Prior Injection Separation (us) | Decay Factor |
|---|---|
| 0 | 2.00 |
| 125 | 1.60 |
| 250 | 1.40 |
| 500 | 1.20 |
| 1000 | 1.00 |
| 2000 | 0.50 |
| 4000 | 0.25 |
| 8000 | 0.00 |
| 16000 | 0.00 |

704

METHOD AND SYSTEM FOR FUEL INJECTOR BALANCING

FIELD

The present description relates generally to methods and systems for calibrating a fuel injector of an engine so as to balance fuel delivery between all engine fuel injectors.

BACKGROUND/SUMMARY

Engines may be configured with direct fuel injectors (DI) for injecting fuel directly into an engine cylinder and/or port fuel injectors (PFI) for injecting fuel into an intake port of an engine cylinder. Fuel injectors often have piece-to-piece variability over time due to imperfect manufacturing processes and/or injector aging, for example. Over time, injector performance may degrade (e.g., injector becomes clogged) which may further increase piece-to-piece injector variability. As a result, the actual amount of fuel injected to each cylinder of an engine may not be the desired amount and the difference between the actual and desired amounts may vary between injectors. Variability in fuel injection amount between cylinders can result in reduced fuel economy, increased tailpipe emissions, torque variation that causes a lack of perceived engine smoothness, and an overall decrease in engine efficiency. Engines operating with a dual injector system, such as dual fuel or port fuel direct injection (PFDI) systems, may have even more fuel injectors (e.g., twice as many) resulting in greater possibility for injector variability.

Various approaches estimate injector performance by correlating a pressure drop across a fuel rail coupled to an injector with a fuel mass injected by the corresponding injector, also known as pressure base injector balancing (PBIB). One example approach is shown by Surnilla et al. in U.S. Pat. No. 9,593,637. Therein, a fuel injection amount for a direct injector is determined based on a difference in fuel rail pressure (FRP) measured before injector firing and FRP after injector firing. After learning individual injector errors, engine fueling is adjusted so as to bring all injector errors towards a common error, thereby balancing injector errors. To reduce confounding of FRP estimation results with other causes of pressure change, such as other direct injectors firing simultaneously, as well as pump strokes of a (cam actuated) high pressure direct injection fuel pump, the pump is disabled before injector firing is initiated.

The inventors herein have recognized potential issues with such systems. As one example, PBIB based methods require consecutive injection events to be spaced apart by more than a threshold duration, or distance in crank angle degrees. However, direct injection (DI) fuel systems may deliver multiple fuel injections on a given injection event. For example, the total fuel for an injection event may be split and delivered over multiple direct injections to address particulate matter concerns, knock concerns, etc. In many instances, the multiple direct injections may be closer than the minimum threshold duration required for PBIB balancing. As an example, the injections may be closer than about 6 milliseconds, while PBIB balancing requires at least 8 milliseconds of inter-injection spacing. The smaller inter-injection spacing for multiple DI events may preclude PBIB from being used to learn DI errors and adapt or trim injector fueling on subsequent events. It may also not be practically feasible to learn injector errors by mapping every combination of multiple pulse-widths and fuel rail pressure. As a result, injector variability may persist.

The variability may be further exacerbated by the fact that in multiple direct injections, a prior injection affects the subsequent one. In particular, the DI fuel injector may have three primary influences: the injector opening time, a fuel flow rate when the injector is fully open, and injector closing time. All three factors affect fuel mass metered into an engine cylinder. PBIB based methods provide a measure of fuel mass injected as a result of all three phenomena. After turning off an injector, the electrical and magnetic circuits retain some energy for about 4 or 5 milliseconds. If the injector is powered back on in this time period, the re-opening time is significantly shortened. This affects the fuel mass delivered by the injector.

The inventors herein have recognized that characterization of injectors in two additional dimensions, specifically, prior injection pulse-width and prior injection separation, may enable pulse combinations to be more reliably and feasibly assessed for variability. In particular, for a given injection of a multiple DI event (which may include two or more symmetric or asymmetric injections per injection event), a prior pulse-width affects the residual energy at the injector magnetics at the end of injection (EOI). This may be largely related to injector current existing immediately prior to the injector being turned off. The prior injection separation affects the magnetic energy decay at the injector. In other words, injector off-time (up to, for example, 5 ms) influences the required on-time of the subsequent (closely-spaced) injection. At 600 rpm, a given injector injects once per 200 ms. At 6000 rpm, a given injector injects once per 20 ms and the largest possible injector duration is 12 ms. Thus, single injections do not end up influencing each other through the aforementioned mechanism.

In one example, the issues described above may be addressed by a method comprising: learning a fuel mass error of each injection pulse following a first injection pulse of a group of fuel injections from a direct injector on a cylinder event, the learning based on a total fuel rail pressure drop over the group of fuel injections, and further based on an inter-injection spacing; and adjusting a transfer function for the direct injection during a subsequent group of fuel injection on another cylinder event. In this way, injector variability may be reliably learned through a pressure based balancing method across a combination of pulse-widths and fuel rail pressures including during multiple (or split) direct injection events. Said another way, injector characterization is done for both single injections and multiple injections. From this information, and by noting the injection separation, the effect of injection separation can be accounted for.

As one example, a controller may perform PBIB learning for an injector performing a group of multiple injections on a single cylinder injection event. In one example, the group of injections includes two injections for the given cylinder injection event. The controller may measure a drop in FRP for the double injection and then compute a fuel mass associated with the FRP drop. The controller may then estimate the expected fuel mass drop of the first injection and subtract this from the total double injection fuel mass to determine the fuel mass change from the second injection. In still other examples, the controller may retrieve the expected fuel rail pressure drop and the associated fuel mass from a calibration table populated with data from a single injection per injection event at the given injector at defined pulse-width breakpoints.

In this way, adjustments are made to a direct fuel injector on time on the subsequent injection due to close spacing of that subsequent injection. For example, at 6 MPA FRP, two 400 µs pulses with a 6 ms injection spacing are expected to inject 3 mg each. However, these pulses were spaced by 1 ms, thus when PBIB learning is run, the fuel mass may be learned to be 6.5 mg. This extra fuel is then attributed to the shortened opening time of the second injection (due to close injection spacing). The first injection likely still injected it's expected 3 mg. However, the second injection with its shortened opening time must have injected 3.5 mg. Thus, it is learned that on a 1 ms injection spacing, an extra 0.5 mg of fuel is expected in the subsequent injection.

After calculating the fuel mass from the second injection event of the multiple injections, a second fuel mass error is then scaled so that it can be applied to a reference FRP and not the actual FRP during the injection. One example reference FRP value is 10 MPa. The need for a reference FRP comes from the fact that injectors are calibrated/tested at discrete FRPs and then adjusted for the actual FRP by the square root of the pressure ratio (actual FRP/reference FRP).

Since the residual electrical energy remaining after the first of the double injection affects the opening time of the injector at the time of the second injection, the actual opening time of the second injection needs to be measured to accurately determine the mass error of the injection. In one example, methods that use the injector current signal measure opening and/or closing time. The mass error is then converted into a pulsewidth error via a mapping that accounts for the relation between injection mass and pulsewidth. The learned pulsewidth adjustment is then further adjusted with a decay factor that accounts for a further pulsewidth reduction due to pulsewidth separation between the first injection and the second injection. The decay factor may be determined based on the injector current at the time of injector opening for the second injection since the current affects the solenoid's energy level. The learned error is then used to update an adaptive table which adjusts a pulsewidth for subsequent multiple injections from the given injector.

As an example, if an updated error for a second injection event is determined to be 37 μs, then during a subsequent double injection event from the given injector, the second injection pulsewidth may be reduced by 37 μs to enable injector balancing and fuel injection control. Alternately, one can store the correction in terms of injected fuel mass, but it needs to be referenced to a discrete FRP. The delta FRP (pre-injection FRP minus post-injection FR) approach naturally identifies an actual mass injected. Alternatively, the mass may be converted to a pulse width correction via a fuel injector slope (e.g. 21 mg/sec @10 MPa).

In this way, injector balancing and fuel injection metering can be improved. In particular, injection specific fuel errors can be learned for a group of multiple injections using a reliable fuel rail pressure drop based sensing method even when the multiple injections are separated by less than the minimum separation required for PBIB learning. The technical effect of learning the fuel error for a group of multiple injection events, and then parsing out the individual error of each injection event of the group, is that pulsewidth adjustments for the injection events may be adaptively updated. In particular, fueling errors for each injection event of a group of multiple injection events may be updated to account for the effect of residual electrical energy of a first injection of the group of injections on subsequent injections of the same group, such as on subsequent injection opening time. The residual electrical energy can be accounted for based on both the pulsewidth of an earlier injection as well as a temporal separation from the earlier injection. By adjusting a pulsewidth applied to an injector on each injection of a group of multiple injections, the error between individual errors may be balanced, improving engine performance and lowering exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
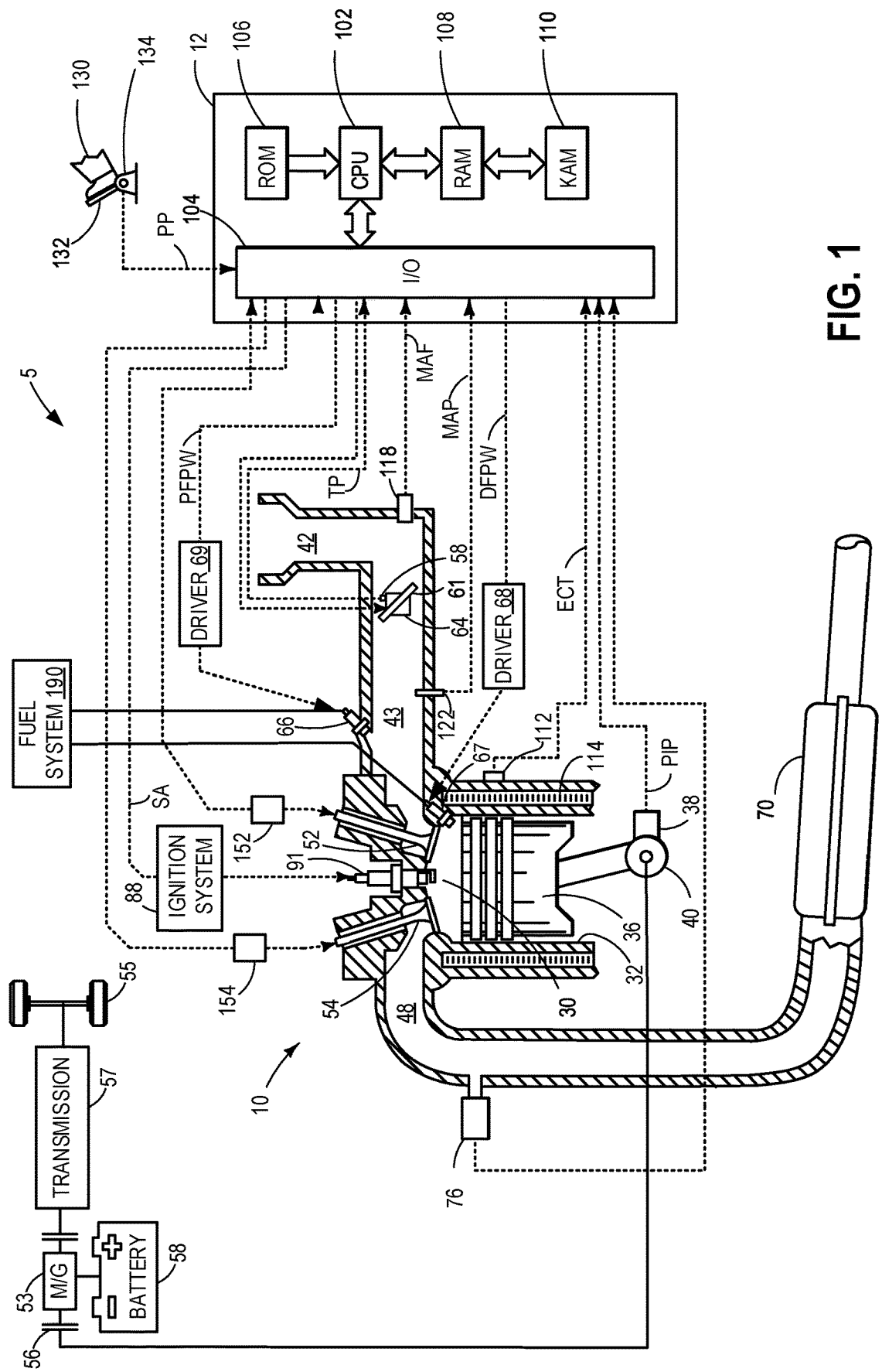
FIG. 1 shows a schematic depiction of an example propulsion system including an engine.
Figure 2:
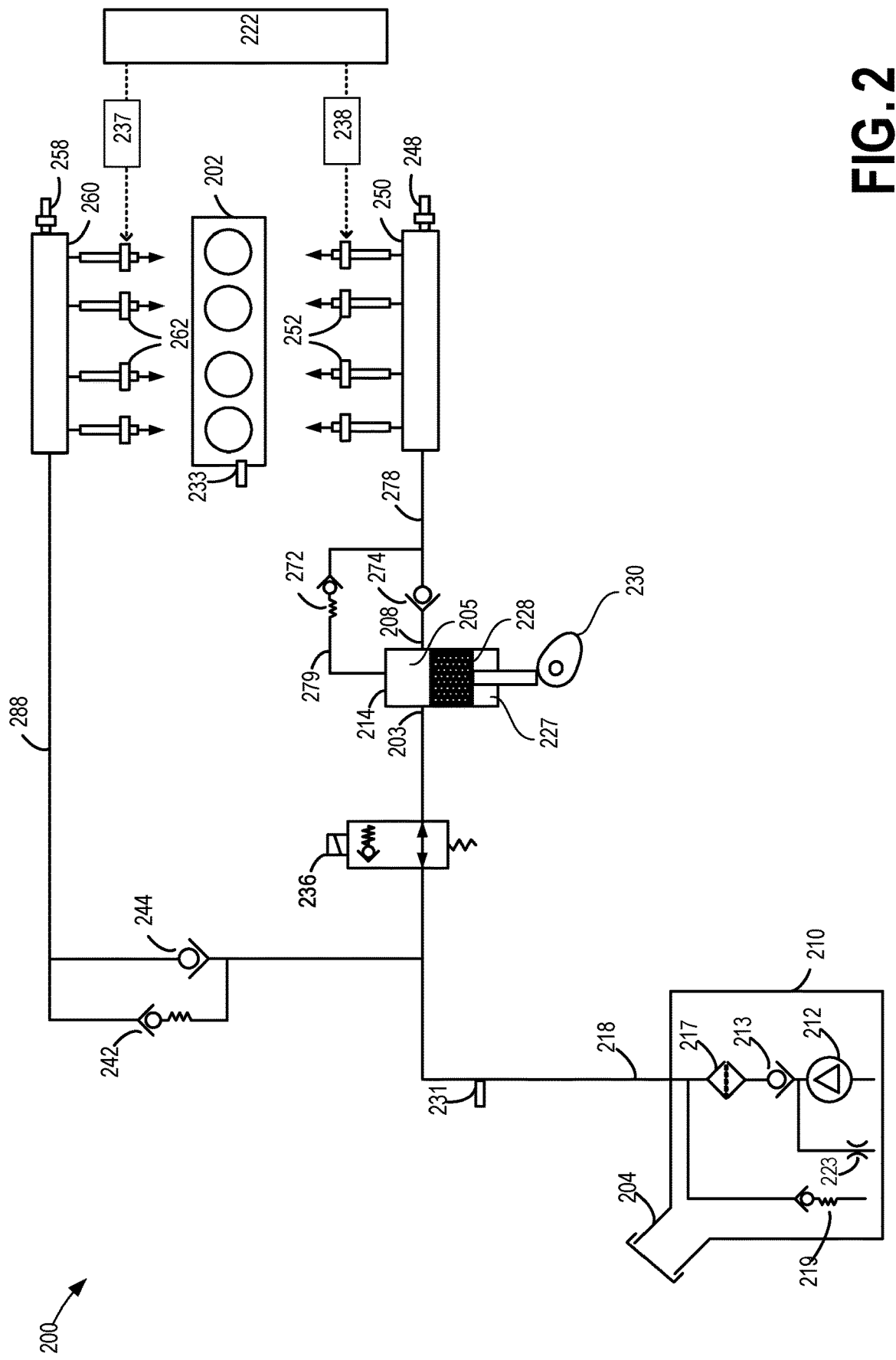
FIG. 2 shows an example fuel system coupled to the engine of FIG. 1.
Figures 4, 7:
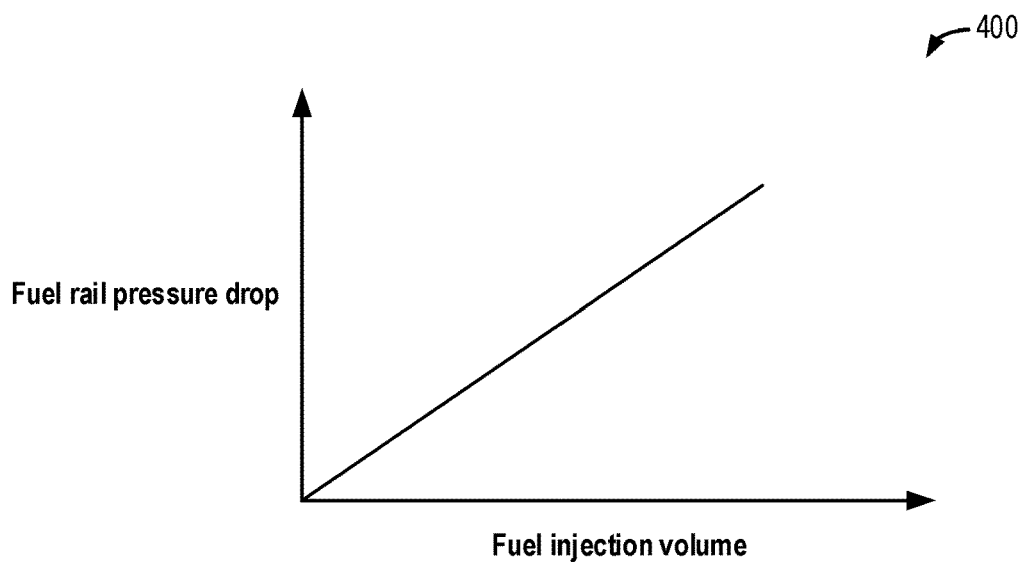
FIG. 4 depicts a graphical relationship between a fuel rail pressure drop and injected fuel quantity at a fuel injection system.
FIG. 7 shows tables depicting example characterization of pulse-width for an injector having a group of multiple injection events on a cylinder event.
Figure 5:
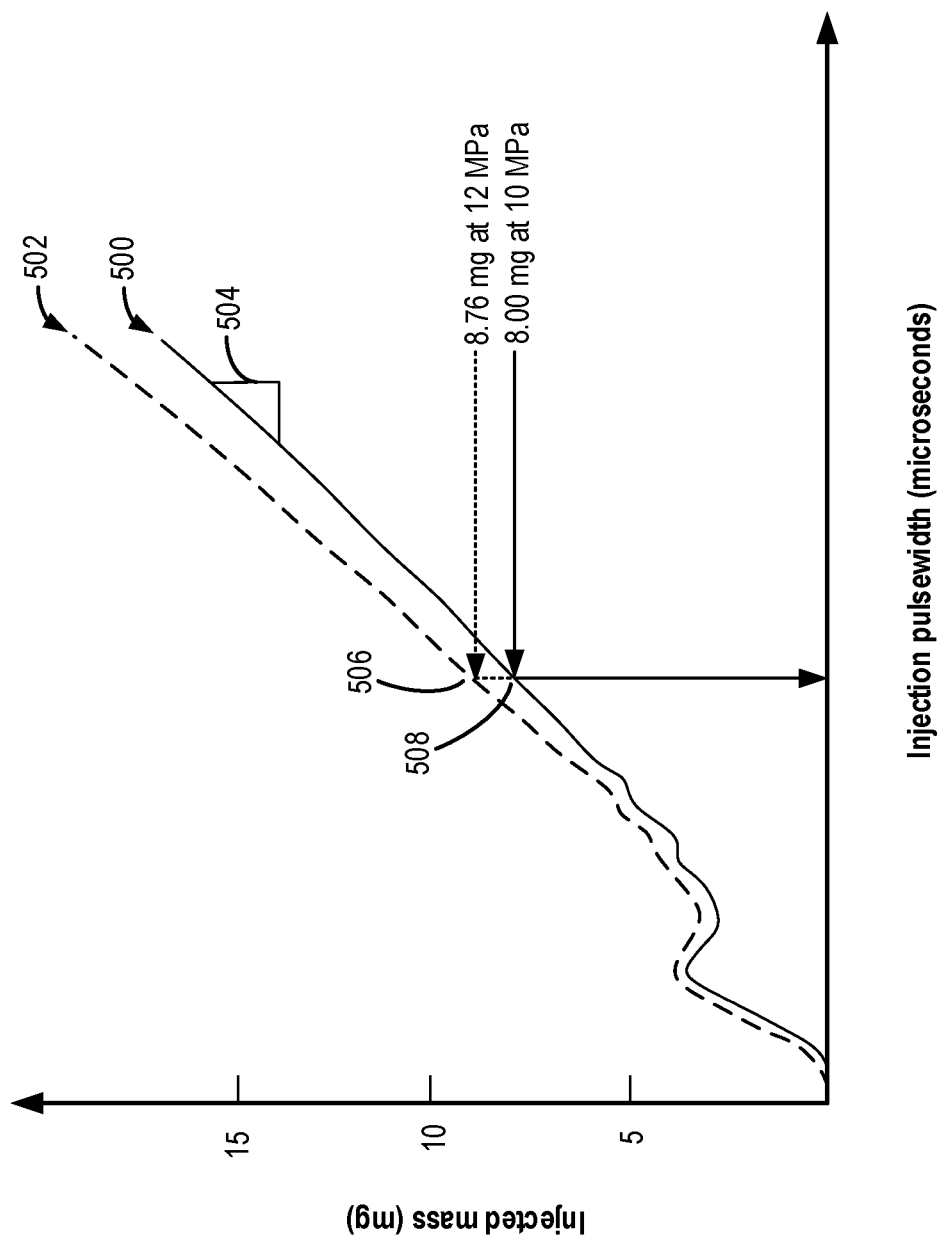
FIG. 5 shows an example characterization of an injector having a single injection event.
Figure 6:
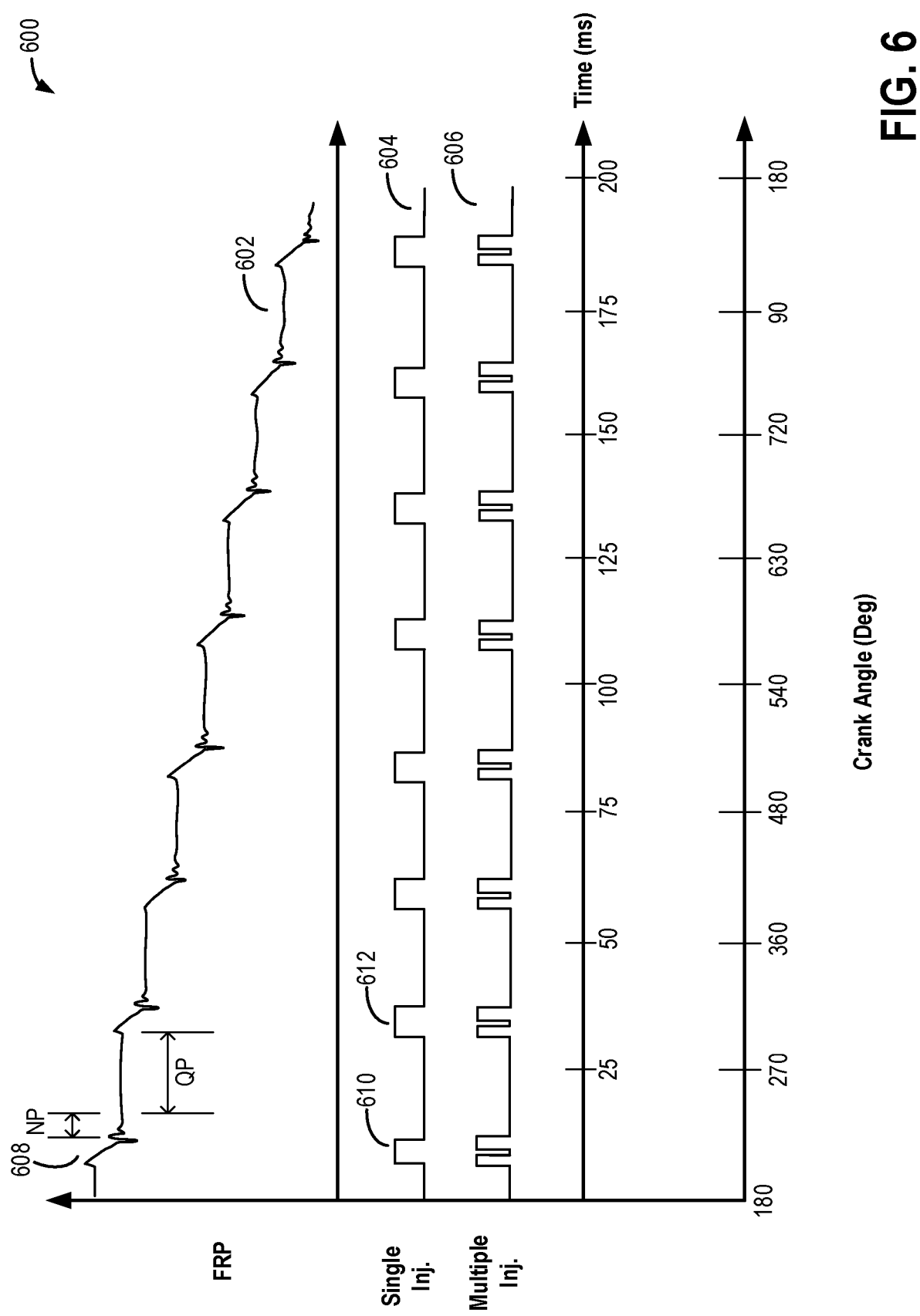
FIG. 6 compares an example spacing between injection events of a group of multiple injection events to single injection events in the context of PBIB learning.

The following description relates to systems and methods for calibrating fuel injectors in an engine, such as the fuel system of FIG. 2 coupled in the propulsion system of FIG. 1. The fuel injectors may be direct and/or port fuel injectors. A controller may be configured to perform a control routine, such as the example routine of FIG. 3, to learn a pulse-width error for an injector delivering multiple injections per injection event (FIG. 6). The controller may learn a fuel rail pressure drop for the group of injections and correlate a sensed pressure drop with a total volume of fuel delivered (FIGS. 4-5). Then, the controller may learn an error incurred on each injection, following a closely spaced prior injection, for the group of injections, by compensating for the effect of residual energy at the injector from prior injections (FIG. 7). In particular, an effect of a prior injection pulse-width and an inter-injection separation in the group of injections may be compensated via a decay factor. Subsequent multiple injection commands directed to the given injection may be adjusted to account for the learned pulse-width error, thereby balancing injector errors and improving fuel metering.

FIG. 1 shows a schematic depiction of a spark ignition internal combustion engine 10 with a dual injector system, where engine 10 is configured with both direct and port fuel injection. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 for delivering injected fuel directly therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. An example fuel system including fuel pumps and injectors and fuel rails is elaborated with reference to FIG. 2.

Direct injected fuel may be delivered over a single injection event or split into multiple injection events per cylinder event. For example, during the single DI injection event, 100% of the fuel mass is delivered to the cylinder as a single DI injection event. In comparison, during the multiple injection event, such as in a double injection event, 50% of the total DI fuel mass may be delivered as a first DI event while a remaining 50% of the total fuel mass may be delivered as a second DI event into the same cylinder. Other ratios may include 30% and 70%, 40% and 60%, etc. Further, a timing of the split injection may be adjusted so that, for example, the first DI event occurs during an intake stroke of the cylinder event while the second DI event occurs during a compression stroke of the same cylinder event. In one example, a split DI injection may be used to reduce particulate matter emissions. Other split injections may include, for example, 3 injections per cylinder event.

Exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 140 of engine 10 and electric machine 53 are connected via a transmission 57 to vehicle wheels 55 when one or more clutches 56 are engaged. In the depicted example, a first clutch 56 is provided between crankshaft 140 and electric machine 53, and a second clutch 56 is provided between electric machine 53 and transmission 57. Controller 12 may send a signal to an actuator of each clutch 56 to engage or disengage the clutch, so as to connect or disconnect crankshaft 140 from electric machine 53 and the components connected thereto, and/or connect or disconnect electric machine 53 from transmission 57 and the components connected thereto. Transmission 54 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 58 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 61, fuel injectors 66 and 67, spark plug 91, etc., to adjust engine operation based on the received signals and instructions stored on a memory of the controller. As one example, the controller may send a pulse width signal to the port injector and/or the direct injector to adjust an amount of fuel delivered to a cylinder.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIG. 3.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a Bosch HDP5 high pressure pump, which utilizes a solenoid activated control valve 236 (e.g., fuel volume regulator, magnetic solenoid valve, etc.) to vary the effective pump volume of each pump stroke. The outlet check valve 236 of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

In one example, the DI pump cam may be placed on the engine's exhaust cam (that is the cam used for controlling exhaust valve timing). Thus in some embodiments, the controller may consider the angle timing of the exhaust stroke when disabling a DI pump lobe. However, it may be that since the exhaust cam angular adjustment is small in range (e.g. 40°) that this is a minor consideration.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Controller 222 may be configured to regulate fuel flow into HPP 214 through control valve 236 by energizing or de-energizing the solenoid valve (based on the solenoid valve configuration) in synchronism with the driving cam. Accordingly, the solenoid activated control valve 236 may be operated in a first mode where the valve 236 is positioned within HPP inlet 203 to limit (e.g. inhibit) the amount of fuel traveling through the solenoid activated control valve 236. Depending on the timing of the solenoid valve actuation, the volume transferred to the fuel rail 250 is varied. The solenoid valve may also be operated in a second mode where the solenoid activated control valve 236 is effectively disabled and fuel can travel upstream and downstream of the valve, and in and out of HPP 214.

As such, solenoid activated control valve 236 may be configured to regulate the mass (or volume) of fuel compressed into the direct injection fuel pump. In one example, controller 222 may adjust a closing timing of the solenoid pressure control check valve to regulate the mass of fuel compressed. For example, a late pressure control valve closing may reduce the amount of fuel mass ingested into compression chamber 205. The solenoid activated check valve opening and closing timings may be coordinated with respect to stroke timings of the direct injection fuel pump. The inlet check valve 236 is in place when the solenoid is powered. When the inlet check valve 236 is selected (via powering the solenoid) the pump will pump on its compression stroke. Pressure relief valve 232 allows fuel flow out of solenoid activated control valve 236 toward the LPP 212 when pressure between pressure relief valve 232 and solenoid operated control valve 236 is greater than a predetermined pressure (e.g., 10 bar). When solenoid operated control valve 236 is deactivated (e.g., not electrically energized), solenoid operated control valve operates in a pass-through mode and pressure relief valve 232 regulates pressure in compression chamber 205 to the single pressure relief set-point of pressure relief valve 232 (e.g., 10 bar above the pressure at sensor 231). Regulating the pressure in compression chamber 205 allows a pressure differential to form from the piston top to the piston bottom. The pressure in step-room 227 is at the pressure of the outlet of the low pressure pump (e.g., 5 bar) while the pressure at piston top is at pressure relief valve regulation pressure (e.g., 15 bar). The pressure differential allows fuel to seep from the piston top to the piston bottom through the clearance between the piston and the pump cylinder wall, thereby lubricating HPP 214. When the solenoid controlled valve 236 is in the powered position, flow is checked.

The number of strokes of the cam lobe 230, and accordingly, the number of engine cyclic pressure patterns applied by the cam lobe on the DI fuel rail pressure, as well as the pressure increase resulting from the pattern, may be a function of the configuration of the cam lobe. For example, cams with three lobes may generate three evenly-spaced throws or lifts, while cams with lobes may generate 4 evenly spaced throws or lifts, and a cam with five lobes may generate five evenly spaced throws or lifts with a 720° cycle of their motion. Further, the fuel flow with a four lobed cam may be higher than with a three-lobed or a five-lobed cam.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 are disabled. In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, it is desirable for every cylinder to have matching fuel injection amounts for matching fuel delivery commands. By balancing air and fuel injection into all cylinders, engine performance is improved. In particular, fuel balancing improves exhaust emission control via effects on exhaust catalyst operation. In addition, fuel balancing improves fuel economy because fueling richer or leaner than desired reduces fuel economy and results in an inappropriate ignition timing for the actual relative fuel-air ratio. Thus, getting to the intended relative fuel-air ratio has both a primary and secondary effect on maximizing cylinder energy for fuel investment.

Injector errors may be learned and addressed by a method known as pressure based injector balancing (PBIB) wherein a pressure drop associated with an injection event is learned by comparing fuel rail pressure (FRP) before and after the injection event, while a fuel pump is disabled. A fuel mass actually delivered during the injection event, estimated based on the pressure drop, is compared to the fuel mass intended to be delivered, inferred based on a pulse-width commanded to the injector. By learning individual injector errors and then adjusting overall engine fueling, each injector can be brought towards a common (e.g., average) error, thereby improving an engine's torque evenness.

However, PBIB learning requires an 8+millisecond inter-injection spacing to allow for the measurement of pre- and post-injection pressures. In particular, the first 3 to 5 milliseconds following the end of an injection (EOI) are a blanking period where the FRP is allowed to settle. From the end of the blanking period, FRP is sampled and averaged until the time of a start of injection (SOI) of the next injection.

Turning briefly to FIG. 6, map 600 depicts changes in FRP over injection events, as may be used for PBIB learning. Plot 604 depicts a pulse-width that may be applied for a series of single injection events into consecutively firing cylinders. The injections are applied at regular intervals of time and/or crank angle degrees (depicted along the x-axis). Each injection event is associated with a corresponding fuel rail pressure drop, the gradual change in FRP shown at plot 602. One example FRP drop associated with a first single injection event 610 is shown at 608. For injection event 610, the associated FRP drop 608 has a noisy period (NP) and a quiet period (QP). The noisy period includes a region of FRP sampling where the injector opens and closes, as well as a duration after injector closing where the pressure oscillates or rings. The quiet period includes pressure samples for the given injection event (event 610) outside of the noisy period and before pressure sampling of a subsequent injection event (even 612). Each injection event similarly has a defined NP and QP. During PBIB learning for injection event 610, samples collected in the noisy period, outside of the corresponding quiet period are discarded, and an average pressure is determined for the samples collected in the quiet period.

In the same way, for the immediately subsequent injection event 612, samples collected in that event's NP (not shown) are discarded and an average pressure is determined for the samples collected in that event QP (not shown). The change in pressure ΔP, corresponding to a difference between the sampled average pressures, is then used to infer a fuel mass that was actually injected and compared to a fuel mass that was intended to be injected. For example, the pressure drop may be used in conjunction with a reference map, such as map 400 of FIG. 4, to infer the fuel injection volume that was delivered. This may be used with fuel rail volume, fuel density, and bulk modulus to estimate the fuel mass that was actually delivered. The difference between the intended fuel mass and the actual fuel mass is then learned as an injector error for the injector that delivered fuel during injection event 610, as a function of the FRP at the time of the injection. The learning is then used to populate and update a map stored in the controller's memory. An example learning of the relationship between fuel injection pulse-width and fuel injection mass, or transfer function, is shown at map 500 of FIG. 5. A finer granularity of the map depends on the undulations in the injector characteristic. Learning occurs per pulse width. For example, there may be 30 pulse widths across the typical injector-operating region. For PFDI systems, a controller may specify a given pulse width and make up the remaining cylinder fuel requirement with PFI injection. Thus, we command one of 30 discrete pulse widths. And we scale the results to the standard levels of fuel rail pressure. This step eliminates the need to finely discretize DI fuel rail pressure. Due to the oscillatory variation in samples in the sample period, the delta pressures returned do not represent a low variability number. Thus, we need to average replicates of the delta pressures. Averaging 15 to 30 replicates reduce the variation to a low level.

The same method is also used to measure one injection or a group of closely spaced injections. The controller chooses a minimum number of injection spacings. One example of a standard spacing is 1 millisecond. However, in other examples, spacings of 1, 2, or 3 milliseconds may be selected. The cost to multiple injector spacing's is that they require a learning for each.

In the disclose approach, the controller may learn a single injection and then learn a multiple injection with a given injection spacing (e.g., 1 millisecond). As an example, if the single injection is learned to have a fuel mass of 3 mg, it may be expected that 2 equal injections would result in a fuel mass of 6 mg. However, since the injector opened sooner on the second injection, a pressure delta that indicates 6.5 mg may be sensed. Thus, the controller may learn that an injection that follows a prior injection by 1 millisecond needs a compensatory 0.5 mg added to it for its expected fuel delivery.

If the series of single injection events (depicted at plot 604) were replaced with a series of multiple injection events, such as a series of double injection events depicted at plot 606, the group of injections would be spaced closer than would allow individual injection PBIB learning to occur. For example, it may not be possible to reliably define the NP and QP for each injection of the group of injections. This could ostensibly prevent the use of PBIB from being used to learn, adapt, and trim individual injection pulses within the multiple injections per cylinder event. As such, it is known that when direct injections on a single injector occur spaced at closer than 6 milliseconds, the occurrence of the prior injection (e.g., a first injection of the group of injections) affects the next one (e.g., a second injection of the group of injections). More specifically, the subsequent injection is affected by a separation between the injection pulses. The prior injection pulse-width affects the residual energy in the injector magnetics (that is, in the solenoid controlling the injector opening) at EOI. This is largely related to injector current at a time prior to injector off at the end of the prior injection. The prior injection separation affects the magnetic energy decay. This decay is negligible after approximately 6 milliseconds.

Figure 3:
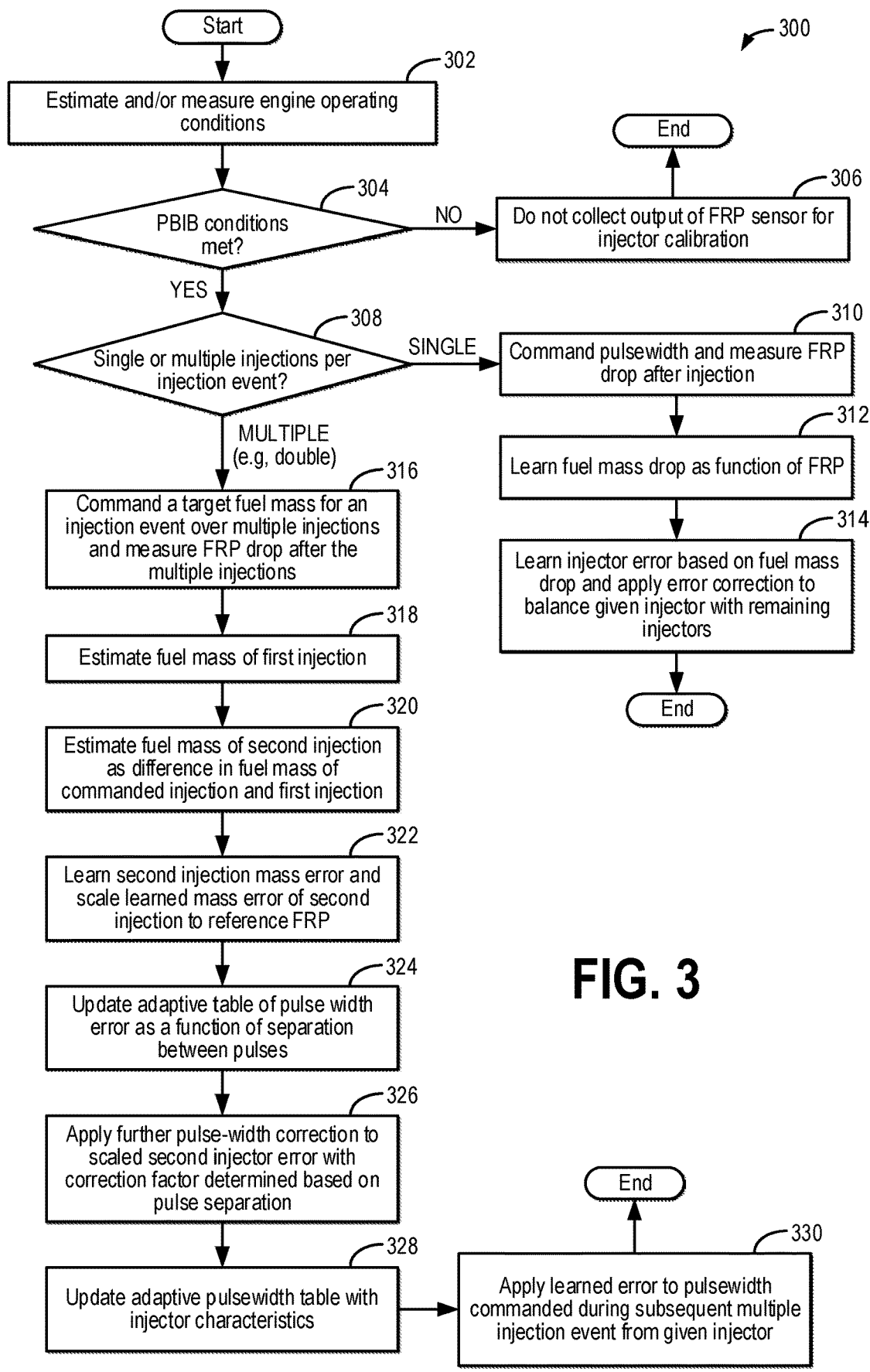
FIG. 3 shows a high level flow chart of an example method for learning individual injection event errors for a given injector based on fuel rail, the injector injecting fuel over a group of multiple injection events per cylinder event.

As elaborated herein with reference to FIG. 3, errors for individual injection pulses of a group of injections from a given injector may be learned by applying a modified PBIB learning. In particular, an FRP drop associated with the whole group of injections may be learned to determine a total fuel mass that was delivered before the fuel mass contribution of each individual pulse, and the associated error, is parsed out. By relying on adaptively populated tables that include correction factors based on prior injection separation, pulse-width corrections can be performed to improve injector balancing and fuel metering.

Turning now to FIG. 3, an example method for accurately learning individual injection errors for each injection of a group of injections via a pressure drop based injector balancing method is shown at 300. The method enables pulse-width adjustments for each pulse in a group of fuel pulses delivering fuel to a cylinder from an injector on a given cylinder event to be learned. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the method includes estimating and/or measuring engine operating conditions. These include, for example, engine speed, torque demand, manifold pressure, manifold air flow, ambient conditions (ambient temperature, pressure, and humidity, for example), engine dilution, etc. Other operating conditions that are continuously monitored include fueling parameters such as fuel rail pressure, injection timings, inter-injection periods, and DI pump stroke timing.

At 304, it may be determined if pressure based injector balancing (PBIB) conditions are met. Alternatively, it may be determined if injector calibration conditions are met. If PBIB conditions are met, then PBIB learning can be started. PBIB conditions may be considered met if a threshold duration and/or distance of vehicle operation has elapsed since a last calibration of the engine's fuel injectors. As another example, PBIB may be performed opportunistically, whenever possible. For example, PBIB conditions are considered met if the engine is operating fueled with fuel being delivered to engine cylinders via a direct fuel injector. Therein, any time the direct injectors are in use, the fuel rails may be sampled, and the injectors can be calibrated and balanced for that condition. While the injector calibration and fuel rail pressure sampling conditions are defined as a function of fuel injection pulse width and FRP, it will be appreciated that other variables could be chosen.

In some examples, PBIB conditions may be confirmed on an event by event basis based on the estimated fueling parameters. For example, the controller may look at an upcoming cylinder injection event (which may include a single injection of fuel into the cylinder or a group of injections into the cylinder by the same direct injector), or a threshold number of injection events, to determine if PBIB learning can be performed on them. PBIB conditions are then confirmed if the fueling parameters indicate that there is sufficient inter-injection spacing between consecutive cylinder injection events for enabling FRP sampling and averaging of FRP over a period. This allows for a sufficient FRP sampling window before and after the injection event for PBIB learning. If fueling parameters are indicative of overlap between injection events in cylinders firing immediately consecutive to one another, the FRP signals may not be usable for PBIB learning. The fueling parameters may also be assessed for determining if any of the DI pump strokes grow in angle to encroach an FRP sample and average period. If so, the FRP signal for that event is again rendered unusable for PBIB balancing.

If PBIB conditions are not met, then at 306, the method includes not collecting the output of a fuel rail pressure sensor coupled to a direct and/or a port injection fuel rail. The method then ends.

In other examples, FRP samples may be continuously collected and a decision of whether or not to use them for PBIB balancing is performed based on whether PBIB conditions are met and/or based on whether the samples are usable in view of inter-injection periods and overlap with other injection or pump stroke events. Samples which cannot be used for PBIB learning, such as due to a lower than threshold (e.g., lower than 6 millisecond) separation from a subsequent injection event, or due to overlap from a DI pump stroke, may be discarded.

At 308, responsive to PBIB conditions being met, it may be determined if the upcoming injection event, being analyzed for PBIB learning, includes single or multiple injections per cylinder injection event. As discussed earlier, fuel may be delivered to a cylinder on a given injection event by a direct injector as a single injection or as a split injection wherein the total fuel mass is split between multiple (e.g., 2, 3, or more) injections. If the injection event is determined to be a single injection event, then at 310, the method proceeds with the conventional PBIB learning wherein a pulse-width is commanded to the fuel injector of the cylinder and FRP is sampled at defined intervals to estimate a FRP drop over the injection. For example, a pulse-width is commanded to the fuel injector based on the fuel mass desired to be delivered. The desired fuel mass may be a function of the engine torque requested by an operator at the time of the PBIB learning. During the injection and injector calibration operation, the controller continually samples fuel rail pressure (FRP) at a defined sampling rate, such as at 1 sample every 1 millisecond. Samples may be indexed in terms of injection event number, as well as engine position. The fuel rail pressure sampled may include a port injection fuel rail pressure when the injection event is a port injection event, or a direct injection fuel rail pressure when the injection event is a direct injection event. In one example, fuel rail pressure is sampled at a 1 kHz frequency. For example, the fuel rail pressure may be sampled at a low data rate of once every 1 millisecond period (that is, a 1 millisecond period, 12 bit pressure sample). In still other examples, the fuel rail pressure may be sampled at a high speed, such as a 10 kHz (that is, a 0.1 millisecond period), however the higher sampling rate may not be economical. As a result of the sampling, a plurality of pressure samples are collected for each injection event from each injector of the engine (or from a selected group of injectors selected for PBIB learning), in the order of cylinder firing. Herein, each injection event is defined as a period starting from just before injector opening, and ending just before the opening of another injector on a subsequent injection event. The pressure signal may improve as the number of firing cylinders decreases.

The controller may then learn a pressure drop associated with each injection event performed. In one example, the controller may compare the average fuel rail pressure for the FRP samples collected over a quiet period of the current injection event with an average fuel rail pressure for the FRP samples collected over a quiet period of the immediately previous injection event, and the pressure drop may be learned as the difference in the average pressures.

At 312, the fuel mass drop for each injection event is learned based on the measured FRP drop. In other words, the controller estimates the actual fuel mass dispensed at a given injection event based on the corresponding learned pressure drop. In one example, a map correlating pressure drop with injection mass, such as map 400 of FIG. 4, may be used for estimating the dispensed fuel mass. In the depicted example (map 400), there is a linear relation between drop in fuel rail pressure over an injection event and the fuel injection volume dispensed by an injector during that injection event. A model, transfer function, look-up table, or algorithm may then be used to learn the dispensed fuel mass from the fuel dispensed fuel volume. The actual fuel mass injected is determined from the fuel injection volume by accounting for the bulk modulus of the fuel, and the fuel density, and the fuel rail volume at the time of the injection. In one example, the actual mass injected is determined as per equation (1):

$$\text{Actual mass injected}=(\text{Delta}P/\text{bulk modulus})*\text{fuel rail volume}*\text{fuel density} \quad (1)$$

wherein DeltaP is the measured fuel rail pressure drop.

The injected fuel mass is also learned as a function of the FRP existing at the time of the injection. The pressure drop at a given injection event may also be learned and indexed as function of the injector identity and the corresponding cylinder identity.

At 314, the controller learns an injector error based on the estimated fuel mass drop and applies a corresponding error correction to balance the given injector's error with remaining injectors. For example, the controller may compute an injector error between the intended injection mass that was commanded (based on the commanded duty cycle pulse width and average FRP at the time of the injection event) and the actual injection mass delivered, as computed from the pressure difference. The computed difference in fuel mass is the injector error that needs to be compensated for in future injections to balance injectors. Specifically, a fuel mass error for the given injector is computed as a difference between the commanded fuel mass (determined based on commanded pulse-width) and the actual fuel mass (determined based on the measured delta pressure). The fuel mass error for the given injector is then compared to the corresponding fuel mass error for other cylinders, or an average fuel mass error for all engine cylinder injectors. For example, the fuel mass error for a first port or direct fuel injector via which fuel is dispensed into a first cylinder during injection_n is compared to a fuel mass error for corresponding port or direct fuel injectors via which fuel is dispensed into each of the remaining engine cylinders over a single engine cycle (where each cylinder is fueled once over the cycle). Based on the differences in fuel mass error between the injectors, a degree of balancing required between injectors is determined. The corrections across all injectors are computed, averaged, and then the average is subtracted from the individual injector corrections to learn the remaining injector-to-injector corrections needed to balance the injectors without affecting the average fueling across the cylinders. In this way, the relative errors between fuel injectors is learned and corrected for via a pressure based injector balancing (PBIB) approach. The controller then applies a fuel correction to each fuel injector based on the corresponding learned error to balance errors between injectors. More particularly, a fuel correction is applied to all engine fuel injectors so that all injectors have a common average error. For example, a transfer function of each fuel injector may be updated based on the learned fuel mass error for each injector and an average fuel injector error to reduce the variability in fuel mass injected by each injector for a given pulse width command. The controller may learn a fuel mass error of a given fuel injector based on a sensed change in fuel rail pressure after commanding the pulse-width, and adjust a transfer function of the fuel injector during a subsequent fueling event at the same injector to bring the learned fuel mass error towards a common fuel mass error across all engine fuel injectors. The method then ends.

It will be appreciated the errors are not corrected in one single measurement as there may be noise in the measurement. Thus, the controller aims to correct the average error, instead of trying to respond to the system noise. In one example, this is done by making a percent of the requisite correction at each pass, e.g. 20% on the first pass and then taking another measurement and making another 20% correction on the second pass, and so on. In this way, the corrections will result in the average error converging toward zero.

For example, if the controller commanded an injection of 8.000 mg to injector_n based on the average FRP (estimated via the moving window or quiet region approach) and from the pressure drop following the injection event at injector_n, an actual injection mass of 8.200 mg was determined, then the controller may learn that the given fuel injector over-fueled by 0.200 mg. To balance the errors for all injectors, a similar error is determined for each injector and averaged. The 0.200 mg error of injector_n is compared to the average error. For example, if the average error is computed to be 0.180 mg, then the fueling of each injector is adjusted to bring the injector error (for each injector of the engine) to the average error. In this case, the command to injector_n is adjusted to account for a 0.020 mg surplus. As such, adjusting the injector error to balance the injectors is different from adjusting the error to correct for it. To correct for the error, the injector command would have been adjusted to account for a 0.200 mg surplus.

The injector error learned on the single injection event may be used to correct injector error on subsequent single injection events from the given injector. In addition, the learned injector error may be used to populate a table that is then used to learn injector error for the given injector when performing multiple injection events. As elaborated below, after determining the characteristic for an injector performing one injection, the controller may learn the error as a characteristic for a first pulse of a group of injections. This is because the first pulse of a group of injections is not affected by a prior pulse. Then, the controller may command the injector to perform a double injection and find the characteristic for the second pulse of the double injection based on a total FRP drop over the double injection and the characteristic of the first pulse. Similarly, after learning the characteristic of the first and second pulse, the controller may command the injector to perform a triple injection and find the characteristic for the third pulse of the triple injection based on a total FRP drop over the triple injection and the characteristic of the first and second pulses, and so on. The learning on the double or triple pulse may be performed actively (by actively commanding the double or triple pulse) or opportunistically, such as when the injector commands a double or triple pulse due to existing engine operating conditions.

Returning to 308, if the upcoming injection to be assessed includes multiple injection events per cylinder event, then the controller proceeds to perform a modified version of the PBIB learning. Specifically, at 316, the controller commands a target fuel mass to be delivered over the injection event over multiple injections per cylinder event. The total fuel mass may be determined as a function of engine speed and driver torque demand. In one example, where the learning is to be performed actively, after having performed the characterization of a single pulse of the injector during a single injection event (as at 310-314), the controller may command a double injection event from the injector. Each injection of the double injection may be commanded to deliver the same amount of fuel as the earlier single injection. For example, following a single injection that commands 3 mg of fuel, a double injection is commanded wherein each injection is commanded to deliver 3 mg of fuel. Since the engine also has to deliver the fuel commanded based on torque demand, the controller may adjust the fuel pulses so as to enable the torque demand to be met while also adjusting the fuel pulses to enable the learning to be concurrently performed.

The two 3 mg pulses that are commanded on the double injection are expected to make 6 mg. However, when they are spaced closely (e.g., X milliseconds apart), an early opening on the second pulse may result in the actual delivery of 6.5 mg of fuel. Thus, 0.5 is the fix addend learned for the pulse that was delivered X milliseconds after the end of the previous pulse.

In one example, the double injection may include a total fuel mass split as a 50% DI intake stroke injection: 50% DI compression stroke injection. Still other split ratios may be possible without departing from the scope of the invention. Further, the controller may continuously sample the FRP during the double injection and measure a total FRP drop over the multiple injections. For example, the controller may compare the average pressure of FRP samples collected over a quiet period of an immediately previous single injection event (during the immediately previous cylinder event) with the average pressure of FRP samples collected over a quiet period following the second pulse of the double injection event (and before an immediately subsequent cylinder event). The pressure difference may be learned as the total FRP drop over the current double injection.

At 318, the fuel mass associated with the measured total drop in FRP may be estimated as per the equation (equation (1)) discussed earlier. Therein the fuel rail pressure drop is first converted to a fuel volume dispensed by accounting for the effective bulk modulus and the fuel rail volume. The fuel volume dispensed is then converted to a fuel mass injected by accounting for fuel density. The injected fuel mass is also learned as a function of the FRP existing at the time of the injection. The pressure drop is also learned and indexed as function of the injector identity, and the corresponding cylinder identity.

At 318, the fuel mass of the first injection of the double injection is estimated. The controller may retrieve the injector error (or characteristic) of the injector for a single injection event and use this to estimate the actual fuel mass delivered on the first fuel pulse. In one example, after characterizing the injector following a single injection event, the controller may generate a map, like map 500 of FIG. 5, for the given injector. Then, during the characterization of the multiple injection event, the controller may retrieve map 500 and use it to determine a fuel mass delivered from the injector on the first injection pulse for the commanded split injection.

As an example, for a PFDI system, the controller may be able to deliver any amount of DI fuel as long as the total fuel requested for that particular cylinder event is not exceeded. Thus, the controller may run through a fueling sequence. For example, the controller may choose one of a few FRPs (e.g. 6, 12, 20 MPa) and set the pulse-width to a plurality (e.g., 30) different numbers, such as: 220, 230, 240, 250, . . . 600, 1200, and 3000 microseconds. The controller then repeats this for the double injection after learning the single injections. Further, the controller may select a standard separation between injections, such as 1 millisecond spacing.

At 320, after estimating the fuel mass of the first pulse, the controller estimates the fuel mass delivered on the second pulse. The controller may subtract the fuel mass estimated for the first injection pulse from the total fuel mass delivered (as inferred from the FRP drop at 316) to infer the fuel mass of the second injection pulse. The fuel mass delivered on the second pulse is then used to learn and adapt the mass contribution due to the second injection.

At 322, the controller learns the second injection mass error as a difference between the actual fuel mass delivered on the second pulse (as learned at 320) and the fuel mass intended to be delivered on the second pulse (as inferred from the split pulse-width commanded to the injector at 316). Also at 322, the second injection mass error is scaled in reference to the FRP. In particular, a correction factor is applied to compensate for the difference between the FRP at the time of the second injection pulse relative to a reference FRP. This compensation is used to provide an integral control to alter a modification table since it mixes in with integral gain. The correction converts the second injection's fuel mass error into a pulse-width error.

One example method for choosing an FRP is to look primarily at the intended fuel mass and the time available to inject the fuel mass. As engine speed increases, the time to inject becomes smaller. To shorten the time it takes to deliver a given fuel amount, the fuel pressure is raised. Thus, historically, the controller raises fuel rail pressure primarily with engine speed and secondarily with desired DI fuel amount. Desired fuel rail pressure is historically continuous in nature; however, we have noticed that making it have discrete values is advantageous. Now, fuel rail pressure may take any value during operation, but setting discrete FRPs is useful because then for most of the operation, the injectors are operating both where they were originally calibrated and where they did their PBIB learning.

Those discrete pressures become the reference pressures. Using the terminology of the previous design, these are break point FRPs (points on a broken line graph that are interpolated between). The controller may choose, for example, 3 reference FRPs which also are our discrete desired FRPs. And, importantly, each of these reference/ desired FRPs may have its own injector current waveform. Since the controller operates actual FRP off of desired/ reference FRP, we need a way of scaling injection masses to the pressures. This is done by scaling by the square root of the ratio of actual pressure to reference pressure. With reference to the earlier example, a 300 microsecond pulse width may result in 3 mg at 6 MPa but it will result in more fuel mass if the FRP is slightly in excess of 6 MPa. Thus we compute the expected mass by:

$$\text{Mass} = \text{mass}@6\text{ MPa} * \text{sqrt}(\text{actual FRP/reference FRP})$$
where reference FRP is 6 MPa.

The second pulse width is adjusted at the very same breakpoints as the first. Furthermore, the pulse-width (PW) correction of the second pulse requires two additional dimension corrections, compensating for both the prior injection pulse's pulse-width and separation between the pulses. Since the residual electrical energy of the injector after the first pulse is expected to affect the opening time of the injector at the second pulse, the opening time of the second pulse needs to be measured and then accounted for.

The controller may refer to map 500 of FIG. 5 to convert the fuel mass error into a pulse-width error, such as a full lift gain. As an example, map 500 may be used to convert the error. For example, using the mapping at full lift gain (plot 500), it may be determined that if the mass error for the second injection pulse is 1 mg, the PW correction required is, as per equation (2):

$$\text{Second\_inj\_PW\_error\_at\_ref\_FRP} = \text{Second\_inj\_mass\_error\_at\_ref\_FRP}/0.020 \text{ mg}/\mu\text{s} = 50 \text{ }\mu\text{s}. \quad (2)$$

For example, the controller may apply a fine pulsewidth spread learning over the small PWs (e.g. 200 to 600 microseconds). In this region, the fuel amounts are generally less that what any running engine needs. Thus it allows the controller to do an invasive study running through a set of PWs. The second phase may assess the larger PWs. The larger PWs have to be learned opportunistically when the engine control is calling for large PWs. The injector characteristic is fairly straight in this zone and one does not need the fine PW spacing required in the low PW zone. For example, the controller can learn at 800, 1000, 1500, 2000, and 3000 microseconds in this zone. The learning is performed in the same way with the controller waiting until the commanded total engine fuel exceeds the fuel that those PWs would provide. Thus, if the normal DI PW would be 2104 microseconds, it gives the controller the opportunity to inject at break points 2000, 1500, 1000, or 800 microseconds. The balance of the fuel would be injected via PFI (or via DI in a different part of the engine stroke).

This pulse-width adjustment, via an integral adaptation, is applied to the two dimensions of duration of previous pulse and separation from previous pulse. The implementation includes, at 324, updating an adaptive table of pulse-width error as a function of separation between pulses. For example, the controller may construct an array, or an adapted look-up table that is to be looked-up subsequently. The array may represent the reduction in PW for the second pulse at a defined separation (e.g., a base separation of 1000 µs). To the extent possible, it is good to standardize the separation. In this way there is less to learn, thus learning occurs sooner than if a larger number of discrete separations had to be learned.

An example array is shown at table 702 of FIG. 7. Therein, the right column shows the a priori established index into the table representing the prior PW. The left column shows the PW reduction determined from the current learning.

For example, a large effect may be observed with a small separation between pulses and a small effect may be observed on a large separation between pulses. Further, the separation may be standardized. For example, assume that the learning is performed for each reference FRP. Then, the controller could add fuel mass for each separation. For example, the controller could add 0.3 mg for 1 ms of separation, 2.2 mg for 2 milliseconds of separation, and so on until we get to 0 mg for 6 milliseconds of separation. Alternatively or additionally, the controller may translate between pulse width corrections and fuel quantity corrections, but the data itself shows up as fuel quantity correction. The physical thing that is occurring is that the injection opens sooner than otherwise, so it is reasonable to think of that as a correction to pulse width. Thus, the correction can be represented in either manner.

Next, at 326, the method includes applying a further PW correction to the scaled second injector error with a correction factor determined based on pulse separation. As such, as the separation between the first pulse and the second pulse of the double injection increases, the magnetic energy of the injector decays. The correction factor, also referred to as decay factor, may be determined a priori and used to populate another table, such as table 704 of FIG. 7. For a base separation time of 1000 μs, the decay factor is 1.0. As a the separation decreases, the decay factor increases due to the higher effect of the injector's magnetic energy at the end of the first pulse on the second pulse of a double injection (or the effect of a second pulse on a third pulse of a triple pulse, and so on).

As an example, if the first PW of a double injection (or any prior PW delivered immediately prior to another PW being characterized) is 400 μs, the subsequent pulse reduction is 60 μs (in accordance with table 702 of FIG. 7). If the prior injection separation is 2000 μs, the decay factor is 0.50 (in accordance with table 704 of FIG. 7). The PW decay factor when applied to the product results in: 60 μs×0.50=30 μs.

At 328, the method includes updating the adaptive PW table with injector characteristics. That is, the computer PW reduction is used to update the value in the adaptive table referenced to a separation time of 1000 μs (that is, table 702 of FIG. 7). Then, at 330, the learned error is applied to a commanded PW during a subsequent multiple injection event from the given injector. The method then ends.

For example, say the prior injection PW (e.g., PW of first pulse of double injection) was 400 μs and the pulse separation is 2000 μs, then the decay factor is 0.50 (in accordance with table 704 of FIG. 7). Further, say the second injection PW error at the ref FRP is determined to be 50 μs.

The controller first references the PW to the error at the reference separation using the decay factor according to equation (3):

$$\text{PW\_error\_at\_ref\_separation} = \text{second\_injection\_PW\_error\_at\_ref\_FRP} / \text{decay factor} \quad (3)$$

Using this equation, the PW error is determined to be 50 μs/0.50=25 μs.

Thus the value that was currently in the adaptive table was 50 μs but the new value is determined to be 25 μs. In other words, there is an error of 25−50=−25 μs. The adaptive increment is determined according to equation (4):

$$\text{Adaptive increment} = \text{Error} \times \text{Integral gain} \quad (4)$$

In this example, the adaptive increment is −25 μs×0.2=−13 μs.

For example, when running a batch operation on the small pulse widths, the controller may perform 30 or so replicates of every pulse width at every FRP. We will get an average of the 30 replicates and use that number as the fuel quantity correction (in mass or volume). The small pulse widths are suited to doing an invasive test in a batch mode. However, the larger pulse widths may have less opportunity to handle them in a batch mode, so a process is required where the controller learns as it goes along. Thus instead of doing 30 replicates, taking the average and using that as the correction, one uses an algorithm more suited to learning as you go along. In this situation, one gets data every time you inject a known amount and are able to do a delta FRP measurement due to the injection. Since this is a high noise signal, one mixes it in with the current correction in a first order filter. One does this by adding, for example, 20% of the new correction value with 80% of the old correction value.

Therefore the value in the adaptive table has to be changed from 50 μs to 50−13 μs=37 μs. During implementation, the pulsewidth applied to a second pulse under those conditions has to be reduced from its normal value by 37 μs in this instance.

In this way, PBIB learning is used to detect a fuel mass error which is ascribed to the second pulse of a double injection after having learned the injection characteristic for a single injection. The controller can then compute a corrective increment for a table of PW corrections to be applied to the second, narrowly separated pulse. In this way, the modified PBIB learning enables any fuel injection pulse of a narrowly separated group of injection pulses to be adapted and trimmed, which would otherwise not have been possible via classical PBIB learning due to insufficient inter-injection spacing.

It will be appreciated that while the method of FIG. 3 is described with reference to a double injection, this is not meant to be limiting. The method of FIG. 3 may be similarly reiterated to identify the characteristic for a third pulse of a triple injection, and so on. For example, after characterizing the injector for a single injection, the controller may learn the injector characteristic for a first pulse. This learning is then used to characterize the second pulse of a double injection. The second pulse learning is then used to characterize the third pulse of a triple injection, and so on.

Pulse-width adjustments can also be performed via the use of multiple maps, algorithms, and/or look-up tables, such as the map of FIG. 5. For example, say the injector intends to inject 8.76 mg of fuel at a present FRP of 12 MPa, shown by point 506 on the 12 MPa reference plot 502. However, the controller may only have the injector calibration for 10 MPa, as shown at plot 500. While FIG. 5 only ever applies to a single injection, there are two single injections in the double injection.

As a solution, the controller may reduce the fuel mass by a factor determined as per equation (5):

$$\text{Factor} = \sqrt{\frac{FRPref}{FRPact}} = \sqrt{\frac{10}{12}} = 0.913 \quad (5)$$

Thus the modified fuel mass is 0.913 * 8.76 mg=8.00 mg. This corresponds to point 508 on the 10 MPa reference plot. Therefore the controller may command 8.00 mg at the reference FRP of 10 MPa. Further, assume the pressure drop associated with the commanded fuel mass is 120 kPa.

The actual fuel mass delivered is determined based in the fuel rail volume and density in accordance with equation (1) as:

Actual fuel mass=(120 kPA/700 MPa)*60 ml*0.75 mg/ml=7.71 mg

Fuel mass error=8.76−7.71=1.05 mg

To correct the whole error in one pass, the injector calibration at the commanded PW would need to be bumped up by 1.05 mg. Thus, the injected mass correction would change at the PW under test. With this correction in place, the next time a PW is looked up from a desired fuel mass, the PW would change from the prior event.

In this way, by learning a total fuel rail pressure drop across a group of injections, and by relying on correction factors based on individual pulse widths, and pulse separations, injector characteristics for each pulse of a group of narrowly spaced pulses can be learned. The technical effect of applying a modified PBIB learning for a group of shortly spaced pulses is that the characteristic of ordinal pulses may be sequentially learned. By adaptively learning and updating a fuel mass to pulse width error correction as a function of pulse separation and pulse width, injector corrections for each pulse of a group of injections pulses can be accurately determined. As a result, a controller may be able to provide better balancing between injectors of all engine cylinders, improving engine fueling accuracy and overall engine performance.

One example method for an engine comprises: learning a fuel injection error of each injection pulse following a first injection pulse of a group of fuel injections from a direct injector on a cylinder event, the learning based on a total fuel rail pressure drop over the group of fuel injections, and further based on an inter-injection spacing; and adjusting a transfer function for the direct injector based on the learned fuel injection error when commanding a subsequent group of fuel injections on another cylinder event. In the preceding example, additionally or optionally, the learning is further based on a pulse-width commanded on each injection pulse of the group of fuel injections. In any or all of the preceding examples, additionally or optionally, the learning based on a total fuel rail pressure drop over the group of fuel injections includes: averaging fuel rail pressure sampled after a delay since an end of injector closing following a last injection pulse of the group of fuel injections; learning the total fuel rail pressure drop based on the averaged fuel rail pressure relative to the averaged fuel rail pressure measured on an immediately preceding cylinder event; and converting the total fuel rail pressure drop to an actual total fuel mass dispensed. In any or all of the preceding examples, additionally or optionally, the learning a fuel injection error of each injection pulse of a group of fuel injections is performed after learning the fuel mass error of the direct injector upon commanding a single fuel injection pulse. In any or all of the preceding examples, additionally or optionally, the group of injections includes a double injection and wherein learning a fuel injection error of each injection pulse includes learning the fuel mass error of a second injection pulse of the double injection as a difference between the actual total fuel mass dispensed over the group of injections and a fuel mass dispensed on the first injection pulse, the fuel mass dispensed on the first injection pulse inferred from the pulse-width commanded on the first injection pulse and the learned fuel mass error of the direct injector upon commanding the single fuel injection pulse. In any or all of the preceding examples, additionally or optionally, the method further comprises converting the fuel mass error of the second injection pulse into a pulse-width error by applying a first correction based on the inter-injection spacing between the first injection pulse and the second injection pulse of the double injection. In any or all of the preceding examples, additionally or optionally, the pulse-width error increases as the inter-injection spacing between the first injection pulse and the second injection pulse of the double injection decreases from a threshold separation. In any or all of the preceding examples, additionally or optionally, the method further comprises, after applying the first correction, applying a second correction to convert the fuel mass error of the second pulse into a pulse-width error, the second correction based on the pulse-width commanded on the second injection pulse. In any or all of the preceding examples, additionally or optionally, application of the second correction decreases the pulse-width commanded for the second injection pulse of the double injection as the inter-injection spacing decreases. In any or all of the preceding examples, additionally or optionally, adjusting the transfer function for the direct injector based on the learned fuel injection error includes updating a table of pulse-width transfer functions for a second injection pulse of a double injection of the direct injector based on the corrected pulse-width error.

Another example method for a fuel system comprises: delivering fuel on a cylinder event as a split direct injection from a direct injector; learning a fuel mass error for at least a second injection pulse of the split injection based on each of a total fuel rail pressure drop on the split injection, an inter-injection separation, and a pulse-width commanded on the second injection pulse; and adjusting subsequent fueling from the direct injector based on the learned fuel mass errors. In any or all of the preceding examples, additionally or optionally, the method further comprises: retrieving the fuel mass error for a first injection pulse of the split injection, immediately preceding the second injection pulse, based on a fuel rail pressure drop sensed on an earlier single injection event from the direct injector. In any or all of the preceding examples, additionally or optionally, the split injection includes at least the first injection pulse separated from the second injection pulse with a lower than threshold inter-injection separation. In any or all of the preceding examples, additionally or optionally, learning the fuel mass error for at least the second injection pulse of the split injection includes: learning an actual fuel mass delivered on the second injection pulse based on the fuel mass error of the first injection pulse and a total fuel mass delivered on the split injection, the total fuel mass inferred from the total fuel rail pressure drop on the split injection; calculating an initial fuel mass error of the second injection pulse based on the actual fuel mass delivered relative to a commanded fuel mass based on a commanded pulse-width for the second injection pulse; and updating the initial fuel error with a first decay factor based on the inter-injection separation, and a second decay factor based the commanded pulse-width for the second injection pulse. In any or all of the preceding examples, additionally or optionally, the adjusting includes: learning a pulse-width correction factor for the second injection pulse of the split injection based on the learned fuel mass error for the second injection pulse; during fueling from the direct injector on a subsequent cylinder event, wherein fuel is delivered as a split injection including at least another first and another second injection pulse, selecting a pulse-width command for the second injection pulse based on a target fuel mass to be delivered on the subsequent cylinder; and updating the selected pulse-width command with the pulse-width correction factor. In any or all of the preceding examples, additionally or optionally, when the split injection is a double injection from the direct injector on the cylinder event, the learned fuel error is for the second injection pulse of the double injection; and when the split injection is a triple injection from the direct injector on the cylinder event, the learned fuel error is for a third injection pulse of the triple injection.

Another example system comprises: a direct fuel injector coupled to an engine cylinder, the direct injector delivering fuel from a fuel rail into the engine cylinder as a single or a split injection; a fuel rail pressure sensor coupled to the fuel rail; and a controller with computer readable instructions stored on non-transitory memory that when executed cause the controller to: learn a first pressure drop associated with the single injection of fuel into the cylinder; then learn a second pressure drop associated with the split injection of fuel into the cylinder, the split injection including a double injection; learn a first correction factor for the direct injector based on the first pressure drop; learn a second correction factor for the direct injector based on the second pressure drop; and during a subsequent split injection of fuel from the direct injector, adjust a pulse-width command for a first injection pulse of the split injection with the first correction factor and adjust the pulse-width command for a second, subsequent injection pulse of the split injection with each of the first and the second correction factor. In any or all of the preceding examples, additionally or optionally, the controller includes further instructions to update the second correction factor as a function of a separation between the first injection pulse and the second injection pulse of the split injection. In any or all of the preceding examples, additionally or optionally, the updated second correction factor shortens the pulse-width command for the second injection pulse of the subsequent split injection as the separation increases. In any or all of the preceding examples, additionally or optionally, the direct injector is a first direct fuel injector, the engine further including a second direct fuel injector, and wherein the controller includes further instructions to: learn an injector error for each of the first and second direct fuel injector of the engine; and adjust a transfer function of each injector to bring the learned injector error towards a common error, the common error including an average error of all the learned injector errors.

In a further representation, the engine system is coupled in a hybrid electric vehicle or an autonomous vehicle. In another representation, a method for an engine includes: learning an error between actual fuel mass and commanded fuel mass for fuel delivered as a double injection into a cylinder, the error learned as a function of inter-injection spacing between individual injections of the double injection, and during a cylinder injection event, adjusting a pulse width commanded to a second injection of a double injection as a function of the learned error. In the preceding example, additionally or optionally, the pulse width commanded to the second injection of the double injection is decreased as the inter-injection spacing decreases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    learning a fuel injection error of each injection pulse following a first injection pulse of a group of fuel injections from a direct injector on a cylinder event, the learning based on a total fuel rail pressure drop over the group of fuel injections, and further based on a defined inter-injection spacing from an end of injection of a first injection pulse to a start of injection of a second injection pulse; and
    adjusting operation of the direct injector based on the learned fuel injection error when commanding a subsequent group of fuel injections on another cylinder event.

2. The method of claim 1, wherein adjusting the operation of the direct injector includes adjusting a transfer function of the direct injector, wherein the learning is further based on a pulse-width commanded on each injection pulse of the group of fuel injections, and wherein the learning of the error of the second injection pulse is further based on a duration of the first injection pulse.

3. The method of claim 2, wherein the learning based on a total fuel rail pressure drop over the group of fuel injections includes:
    averaging fuel rail pressure sampled after a delay since an end of injector closing following a last injection pulse of the group of fuel injections;
    learning the total fuel rail pressure drop based on the averaged fuel rail pressure relative to the averaged fuel rail pressure measured on an immediately preceding cylinder event; and
    converting the total fuel rail pressure drop to an actual total fuel mass dispensed.

4. The method of claim 3, wherein the learning a fuel injection error of each injection pulse of a group of fuel injections is performed after learning the fuel mass error of the direct injector upon commanding a single fuel injection pulse.

5. The method of claim 4, wherein the group of injections includes a double injection and wherein learning a fuel injection error of each injection pulse includes learning the fuel mass error of a second pulse of the double injection as a difference between the actual total fuel mass dispensed over the group of injections and a fuel mass dispensed on the first injection pulse, the fuel mass dispensed on the first injection pulse inferred from the pulse-width commanded on the first injection pulse and the learned fuel mass error of the direct injector upon commanding the single fuel injection pulse.

6. The method of claim 5, further comprising, converting the fuel mass error of the second injection pulse into a pulse-width error by applying a first correction based on the inter-injection spacing between the first injection pulse and the second injection pulse of the double injection.

7. The method of claim 6, wherein the pulse-width error increases as the inter-injection spacing between the first injection pulse and the second injection pulse of the double injection decreases from a threshold separation.

8. The method of claim 6, further comprising, after applying the first correction, applying a second correction to convert the fuel mass error of the second pulse into a pulse-width error, the second correction based on the pulse-width commanded on the second injection pulse.

9. The method of claim 8, wherein application of the second correction decreases the pulse-width commanded for the second injection pulse of the double injection as the inter-injection spacing decreases.

10. The method of claim 9, wherein adjusting the transfer function for the direct injector based on the learned fuel injection error includes updating a table of pulse-width transfer functions for a second injection pulse of a double injection of the direct injector based on the corrected pulse-width error.

11. A method for a fuel system, comprising:
delivering fuel on a cylinder event as a split direct injection from a direct injector;
learning a fuel mass error for at least a second injection pulse of the split injection based on each of a total fuel rail pressure drop on the split injection, an inter-injection spacing, a pulse-width commanded on the second injection pulse, and a duration of a first injection pulse of the split direct injection; and
adjusting subsequent fueling from the direct injector based on the learned fuel mass errors, wherein inter-injection spacing is from an end of injection of the first injection pulse to a start of injection of the second injection pulse, and wherein the learning includes updating an adaptive table or array of pulse-width error as a function of the spacing between pulses.

12. The method of claim 11, wherein the split injection includes at least the first injection pulse separated from the second injection pulse with a lower than threshold inter-injection separation.

13. The method of claim 12, wherein learning the fuel mass error for at least the second injection pulse of the split injection includes:
learning an actual fuel mass delivered on the second injection pulse based on the fuel mass error of the first injection pulse and a total fuel mass delivered on the split injection, the total fuel mass inferred from the total fuel rail pressure drop on the split injection;
calculating an initial fuel mass error of the second injection pulse based on the actual fuel mass delivered relative to a commanded fuel mass based on a commanded pulse-width for the second injection pulse; and
updating the initial fuel error with a first decay factor based on the inter-injection separation, and a second decay factor based the commanded pulse-width for the second injection pulse.

14. The method of claim 11, wherein the adjusting includes:
learning a pulse-width correction factor for the second injection pulse of the split injection based on the learned fuel mass error for the second injection pulse;
during fueling from the direct injector on a subsequent cylinder event, wherein fuel is delivered as a split injection including at least another first and another second injection pulse, selecting a pulse-width command for the second injection pulse based on a target fuel mass to be delivered on the subsequent cylinder; and
updating the selected pulse-width command with the pulse-width correction factor.

15. The method of claim 11, wherein when the split injection is a double injection from the direct injector on the cylinder event, the learned fuel error is for the second injection pulse of the double injection; and when the split injection is a triple injection from the direct injector on the cylinder event, the learned fuel error is for a third injection pulse of the triple injection.

16. A system, comprising:
a direct fuel injector coupled to an engine cylinder, the direct injector delivering fuel from a fuel rail into the engine cylinder as a single or a split injection;
a fuel rail pressure sensor coupled to the fuel rail; and a controller with computer readable instructions stored on non-transitory memory that when executed cause the controller to:
learn a first pressure drop associated with the single injection of fuel into the cylinder;
then learn a second pressure drop associated with the split injection of fuel into the cylinder, the split injection including a double injection;
learn a first correction factor for the direct injector based on the first pressure drop;
learn a second correction factor for the direct injector based on the second pressure drop; and
during a subsequent split injection of fuel from the direct injector, adjust a pulse-width command for a first injection pulse of the split injection with the first correction factor and adjust the pulse-width command for a second, subsequent injection pulse of the split injection with each of the first and the second correction factor.

17. The system of claim 16, wherein the controller includes further instructions to:
update the second correction factor as a function of a separation between the first injection pulse and the second injection pulse of the split injection.

18. The system of claim 17, wherein the updated second correction factor shortens the pulse-width command for the second injection pulse of the subsequent split injection as the separation increases.

19. The system of claim 16, wherein the direct injector is a first direct fuel injector, the engine further including a second direct fuel injector, and wherein the controller includes further instructions to: learn an injector error for each of the first and second direct fuel injector of the engine; and adjust a transfer function of each injector to bring the learned injector error towards a common error, the common error including an average error of all the learned injector errors.

* * * * *